United States Patent [19]

Zorich, Jr.

[11] Patent Number: 4,895,645
[45] Date of Patent: Jan. 23, 1990

[54] ANAEROBIC/AEROBIC FILTER PLANT

[76] Inventor: Nicholas F. Zorich, Jr., One Third St., No. 101, P.O. Box 754, Astoria, Oreg. 97103

[21] Appl. No.: 131,989

[22] Filed: Dec. 9, 1987

[51] Int. Cl.⁴ ............................................. C02F 3/30
[52] U.S. Cl. .................... 210/98; 210/150; 210/170; 210/195.1; 210/196; 210/258; 210/261; 210/266; 210/290; 210/605
[58] Field of Search .................. 210/98, 104, 150, 151, 210/170, 195.1, 196, 253, 258, 261, 266, 290, 291, 605

[56] References Cited

U.S. PATENT DOCUMENTS

| | | | |
|---|---|---|---|
| 853,217 | 5/1907 | Bordigoni | 210/150 |
| 3,238,124 | 3/1966 | Burton | 210/150 |
| 3,679,053 | 7/1972 | Koulovatos et al. | 210/104 |
| 3,820,658 | 6/1974 | Cruze, Jr. | 210/104 |
| 3,956,128 | 6/1976 | Turner | 210/150 |
| 4,162,976 | 7/1979 | Monson | 210/170 |
| 4,211,655 | 7/1980 | Jordan | 210/170 |
| 4,253,956 | 3/1981 | Pette | 210/188 |
| 4,274,966 | 6/1981 | Palmer | 210/618 |
| 4,293,421 | 10/1981 | Green | 210/170 |
| 4,421,534 | 12/1983 | Walker | 210/150 |

FOREIGN PATENT DOCUMENTS

| | | |
|---|---|---|
| 480362 | 5/1973 | Australia . |
| 48502 | 10/1888 | Fed. Rep. of Germany . |
| 386495 | 1/1908 | France . |
| 145064 | 11/1980 | German Democratic Rep. . |
| 889631 | 12/1981 | U.S.S.R. . |

Primary Examiner—Peter Hruskoci
Assistant Examiner—Christopher Upton
Attorney, Agent, or Firm—Kolisch, Hartwell & Dickinson

[57] ABSTRACT

The biological filter of the instant invention is intended for use between a septic tank and a drain field and includes a filter tank which receives effluent from a septic tank. The filter tank contains therein aerobic and anaerobic treatment means for treating, simultaneously, aerobically and anaerobically, portions of septic tank effluent. The filter is operable to significantly reduce the levels of all contaminants found in septic tank effluent prior to the releasing of effluent into a drain field.

23 Claims, 3 Drawing Sheets

ANAEROBIC/AEROBIC FILTER PLANT

BACKGROUND OF THE INVENTION

The instant invention relates to filtering systems, and specifically to a filtering system which is intended for use between a septic tank and a drain field.

Septic tanks provide a means of domestic and small commercial sewerage disposal in many parts of the world where municipal or other sewerage treatment facilities are not available. Such systems create pollution problems, however, when they are located in areas which have particularly high water tables or in areas where the water supply comes from ground water. In such instances, the effluent from the septic tanks, which traditionally enters a drain field and is dispersed in the land surrounding the dwelling or business establishment which owns the septic tank, will leach through the soil and will ultimately enter the ground water supply. Such effluent will ultimately contaminate the ground water supply. If the effluent from a septic tank were sufficiently free of biological and inorganic contaminates, such entry into the ground water would not contaminate the ground water supply.

One technique to decrease the level of biological oxygen demand (BOD) and total suspended solids (TSS) in septic tank effluent is to process the effluent through a sand filter prior to allowing the effluent to enter the drain field. Such a system significantly reduces the BOD and TSS content in the effluent, however, organic contaminates, such as fecal coliform, and nitrogen, in its various forms, will not completely be removed by a sand filter, and will ultimately enter the ground water. The presence of fecal coliform in the ground water can result in serious illness if such water is consumed, untreated, by human beings and domestic animals. Additionally, the usual sand filter occupies an area of approximately 400 square feet. Although that area represents a structure of 20 feet on a side, there are many instances where the yard surrounding a dwelling does not provide that much available surface area to allow the installation of such a filter. Also, a conventional sand filter becomes clogged after a relatively short period of time, requiring replacement of the filtering media.

An object of the instant invention is to provide a filter for use between a septic tank and a drain field which is of compact size.

Another object of the instant invention is to provide a filter which will reduce the BOD, TSS and nitrogen content in the effluent discharged from a septic tank prior to the effluent entering a drain field.

A further object of the instant invention is to provide a filter which will provide simultaneous anaerobic and aerobic treatment of septic tank effluent.

Another object of the instant invention is to provide a filter which is relatively inexpensive to install and maintain, and which will purify septic tank effluent with minimal maintenance or attention.

SUMMARY OF THE INVENTION

The biological filter of the instant invention is intended for use between a septic tank and a drain field and includes a filter tank which has an influent line attached thereto from the septic tank. The filter tank has anaerobic treatment means for treating, anaerobically, septic tank effluent and aerobic treatment means for treating, aerobically, septic tank effluent.

The septic tank effluent enters the filter tank at the bottom thereof and is first treated anaerobically by anaerobic treatment means which is located in the bottom of the filter tank. The effluent next enters a holding well and is contained therein until the effluent reaches a predetermined level in the holding well. The effluent then enters connection means and flows into a circulation well. The circulation well includes a circulation pump for pumping the effluent, selectively, through the filter tank, or into the drain field. During the treatment cycle the effluent is pumped from the circulation well into the filter tank where a portion of the effluent is treated aerobically by aerobically treatment means, which is located above the anaerobic treatment means. Another portion of the effluent recirculates through the anaerobic treatment means. Both portions of the effluent are gathered in an area between the anaerobic and aerobic treatment means where the partially treated effluent again enters the holding well and then flows into the circulation well. Once a treatment cycle has been completed, the treated septic tank effluent is pumped into the drain field.

These and other objects and advantages of the instant invention will become more fully apparent as the description which follows is read in conjunction with the drawings.

DETAILED DESCRIPTION OF THE PREFERRED EMBODIMENT

Figure 1:
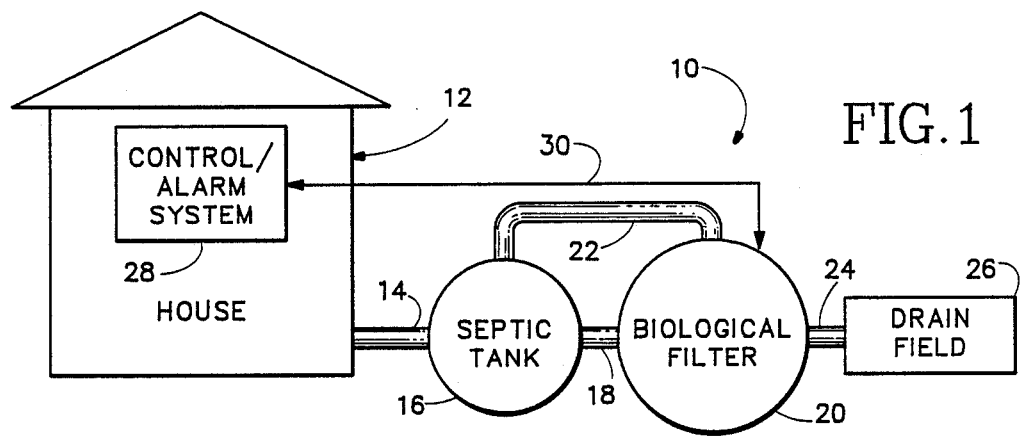
FIG. 1 is a block diagram of a septic tank system incorporating the biological filter of the invention.

Turning now to the drawings, and initially to FIG. 1, a block diagram of a septic tank system is shown generally at 10. System 10 includes the house or business 12 which generates the sewage and waste water to be treated by the remainder of the system. Waste flows from dwelling 12 through a suitable pipe 14 to a septic tank 16 where the waste is initially treated, and the contaminates therein broken down.

Once the treatment in the septic tank has been completed, the effluent enters an influent line 18 which flows, by gravity feed, into a biological filter 20. Filter 20 includes means therein to selectively return sediment collected in filter 20 through line 22 to septic tank 16 for further treatment and means to pass filtered effluent through a pipe 24 to a drain field 26, where the effluent is dispersed into the surrounding ground.

Filter 20 includes sensor means therein, which will be described later herein, which are connected to a control/alarm system, or logic means, 28, which is normally located in house 12, by means of a data bus 30. Alternately, logic means 28 may be co-located with filter 20.

Figure 4:
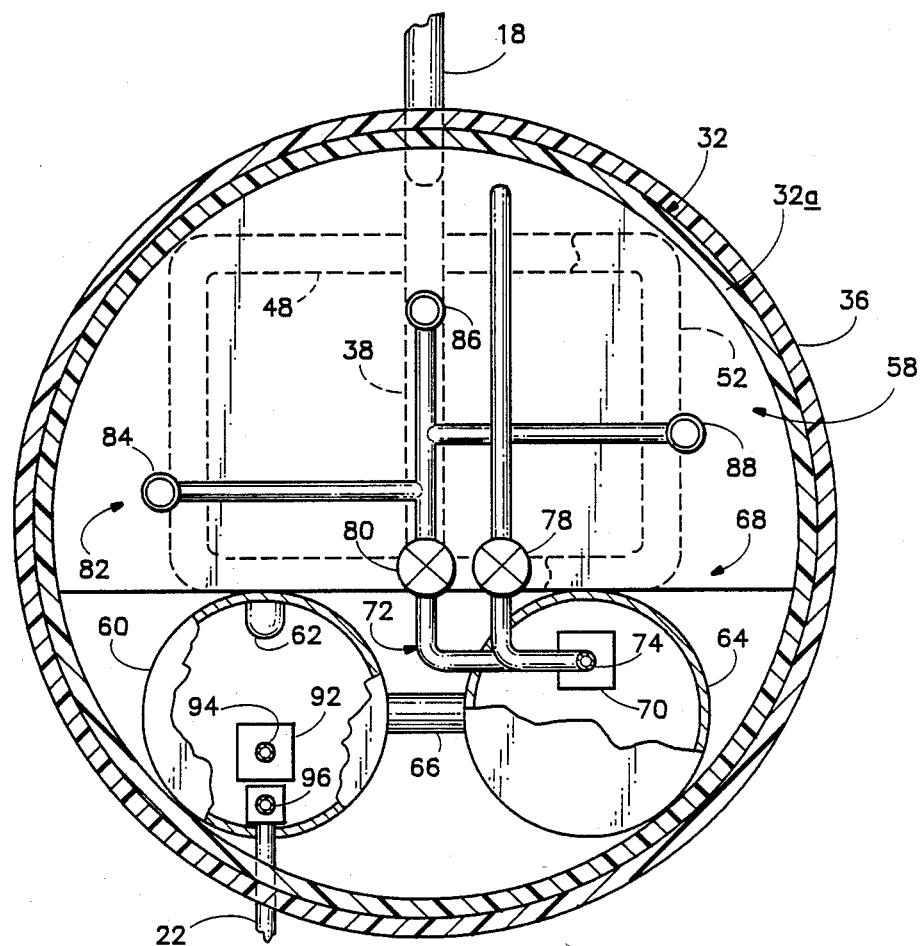
FIG. 4 is a top sectional view of the biological filter of the invention, taken generally along the line 4—4 of FIG. 3.
Figure 2:
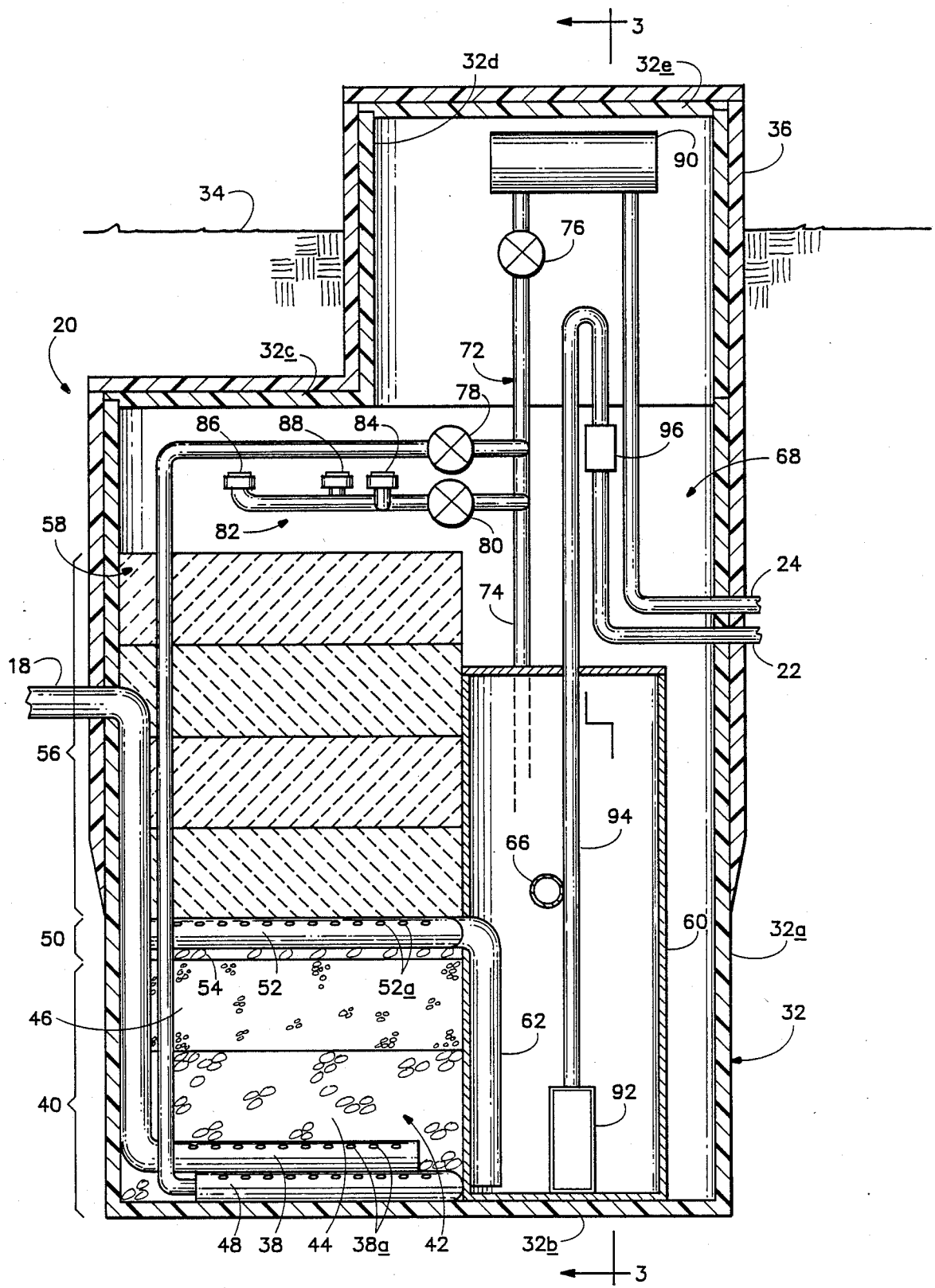
FIG. 2 is a side plan view of the biological filter of the invention, with portions broken away to show detail.
Figure 3:
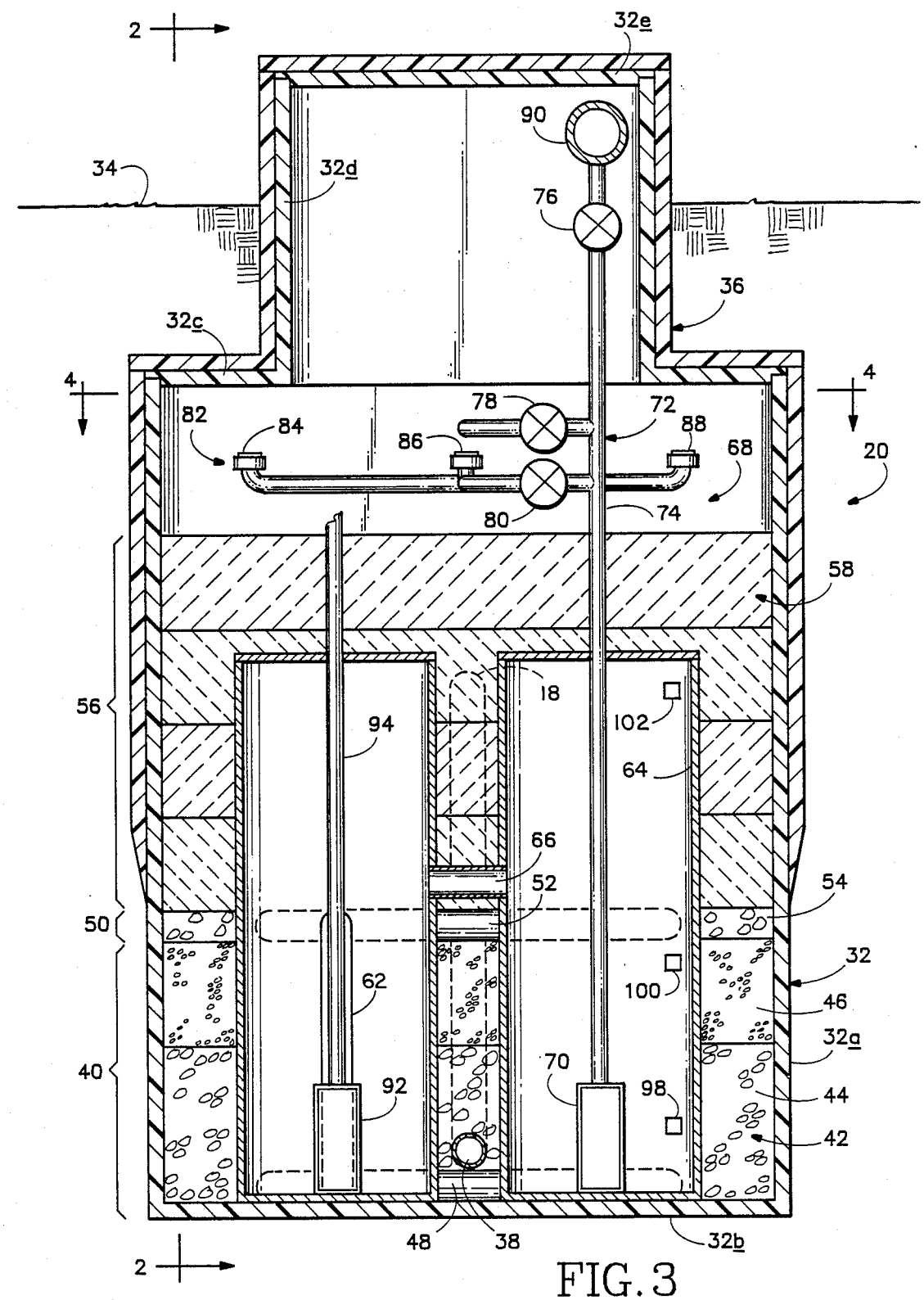
FIG. 3 is a front plan view of the biological filter of FIG. 2, with portions broken away to show detail, taken generally along the line 3—3 of FIG. 2.

Referring now to FIGS. 2, 3 and 4, filter 20 will be described in greater detail. Filter 20 includes a filter tank 32 which, in the preferred embodiment, is constructed of polyethylene, or which may be constructed of segmented concrete. The embodiment described herein is suitable for a single-family dwelling or a small commercial business which may be expected to generate less than 2500 gallons of waste water per day. Larger systems may of course be provided. Single-family dwellings usually generate between 80 and 250 gallons of waste water per day. To this end, a 1400 gallon tank is used for filter tank 32. As will be described later herein, in the preferred embodiment, a number of components are placed inside the tank to accomplish the objective of the filter. The components may be individually housed or grouped into another enclosure, depending on the available space and local building codes.

Tank 32 has a cylindrical side wall 32a which is integrally formed with, or sealed to, a base 32b. Tank 32 includes a cover 32c which has an access port 32d therethrough. Port 32d is closed by a port cover 32e.

Tank 32 is usually positioned beneath ground level 34 such that only a small portion of port 32d, approximately 10 to 12 inches, extends above ground level. A layer of foam-type polyurethane insulation 36 is placed about tank 32, extending several feet below ground level. The insulation is provided to prevent freezing of the liquid in the tank, and to protect the tank from ultraviolet light, which may cause structural degradation of the polyethylene tank material. Insulation 36 and the various joints between tank side 32a, cover 32c and port 32d and port cover 32e are sealed to prevent influx of ground water into the tank, and to prevent the escape of any material from the tank into the surrounding ground. In situations where the ground condition makes underground installation difficult, the filter may be positioned above ground and suitably insulated.

Continuing with reference to FIGS. 2 through 4, but with particular attention paid to FIG. 2, the arrangement of elements within tank 32 will be further explained. Influent line 18 enters through the side of tank 32 and extends downward, emptying into an influent manifold 38.

Influent line 18 and influent manifold 38 are both formed, in the preferred embodiment, of 4 inch diameter PVC pipe, with influent manifold 38 being formed of drain pipe, which has a series of small openings, such as openings 38a, formed therein. Manifold 38 empties into a lower region 40 of tank 32 which has located therein anaerobic treatment means or media, which includes multiple layers of discrete, non-reactive particles, comprising anaerobic treatment means or media 42. In the preferred embodiment, the particles are separated into two layers, with the first layer 44 being comprised of drain rock having a preferred diameter of 1.5 to 2.5 inches. The second layer 46 is formed of aggregate, such as pea aggregate, having a diameter of approximately ⅜ inch. Treatment means 42 fills the bottom of tank 32 and surrounds influent manifold 38, as well as a recirculation manifold 48, which will be described later herein.

A collection region 50 is located above lower region 40. Collection region 50 contains a collection manifold 52, which in the preferred embodiment is formed of 4 inch diameter PVC drain pipe having openings 52a therein. Manifold 52 is surrounded by drain rock, having a diameter of between 1.5 and 2.5 inches. Recirculation manifold 48 has a generally rectangular form, as is shown in FIG. 4, to provide uniform dispersement of effluent in the tank. One or more cross-connections may also be provided to enhance dispersal of effluent into the tank.

An upper region 56 of tank 32 has aerobic treatment means or media 58 located therein. In the preferred embodiment, aerobic treatment media includes a fixed film reactor. The reactor material is formed of corrugated, rigid PVC sheets which are placed in the upper region in connecting layers. The fixed film reactor, or trickling filter, material may be of the type sold by the Munters Corporation, under the trademark BI-Odeck®, and having an identification number of 19060. This particular product has a specific surface area of approximately 140 square meters per cubic meter of material, or 42 square feet per each cubic foot of material. A bioslime will form on media 58 to provide aerobic treatment of effluent.

A pair of smaller tanks are located within filter tank 32. The first of these is referred to herein as a holding well 60 which is connected to collection manifold 52 by a down spout 62. Down spout 62 extends from a side of collection manifold 52, through the side of holding well 60 and terminates just short of the base of holding well 60.

A second internal tank or circulation well 64 (FIGS. 3 and 4) is located adjacent holding well 60 and is connected thereto by connection means 66 which provides for fluid out flow from holding well 60 when fluid therein reaches a predetermined level. In the preferred embodiment, connection means 66 takes the form of a 4 inch diameter PVC connection. Connection means 66 is located at a height of 40 inches on wells 60 and 64, thereby providing flow of fluid from holding well 60 into circulation well 64 when the fluid in well 60 reaches the predetermined height of 40 inches. Holding well 60 and circulation well 64 are formed of polyethylene in the preferred embodiment and have a diameter of approximately 15 inches with an overall height of approximately 6 feet.

A recirculation system is provided within tank 32 and is identified generally by the reference number 68. Recirculation system 68 includes a circulation pump 70 which is located in circulation well 64 and is connected to a selective distribution network 72. Network 72 includes a pipe section 74 which extends upward from pump 70 through the top of circulation well 64. A drain field valve 76 is operable to selectively prevent flow of fluid through pipe 74 to the drain field. A manifold valve 78 and a spray valve 80 are operable to selectively prevent the flow of fluid through pipes going to an array of spray nozzles and recirculating manifold 48. Valves 76, 78 and 80 are of the solenoid actuated type and are controlled by logic means 28. Network 72, under the operation of logic means 28, is operable to provide recirculation of fluid from circulation well 64 to an array of spray nozzles 82, which includes nozzles 84, 86 and 88, which distributes fluid to the top of the aerobic media, and also to distribute fluid to recirculation manifold 48, thereby to recirculate fluid through the anaerobic media. Recirculation manifold 48 is constructed similarly to collection manifold 52.

In the preferred embodiment, approximately 60% of the fluid is pumped through recirculation manifold 48 while the remaining 40% is sprayed over aerobic treatment media 58. Put another way, array 82 is operably connected to circulation pump 70 for broadcasting a first predetermined portion of the fluid over the aerobic treatment media while recirculation manifold 48 is operably connected to circulation pump 70 for dispersing a second predetermined portion of the fluid into the anaerobic treatment media.

Valve 76 may be opened, while valve 78 and 80 are closed, to allow circulation pump 70 to pump treated fluid, at the end of an active cycle, from the circulation well through an ultraviolet light source 90 and then into drain field 26 through pipe 24. Circulation pump 70 is therefore operable to selectively pump fluid through recirculation system 68 or into drain field 26. Light source 90 provides a means to disinfect the fluid before the fluid is pumped to the drain field. Other suitable means of disinfecting the fluid may, of course, be provided.

A recovery pump 92 is located in holding well 60 and is operable to pump fluid and sediment from holding well 60 back to septic tank 16. Such pumping occurs when filter 20 is in a resting condition. Pump 92 is connected by pipe 94 to return pipe 22. A check valve 96 is located between pipes 94 and 22 to prevent flow of material from septic tank 16 into holding well 60.

As shown in FIG. 3, circulation well 64 includes sensors 98, 100 and 102. Sensor 98 is a low water sensor, sensor 100 is a high water sensor and sensor 102 is an alarm sensor. Additional sensors (not shown) are connected to pumps 70 and 92 to report on the operation of the pumps. Ultraviolet light source 90 also has a sensor connected thereto to provide an indication of UV light operation.

Operation

To explain the operation of filter 20, reference is initially had to FIG. 2. Septic tank effluent enters tank 20 through influent line 18 and is dispersed into anaerobic treatment means 42 through influent manifold 38. The level of fluid will rise until anaerobic treatment means are completely covered and fluid begins leaving the filter tank through collection manifold 52. Although anaerobic metabolism is not as complete as aerobic activity, the fluid continues, in the lower region of the tank, to be treated as in the septic tank wherein the fluid and the material contained therein are broken down into compounds that can be utilized by the aerobic organisms in the upper region of the tank. Methane, carbon dioxide, and water are released from the break down of acetic and amino acids, which are generated from the decomposition of protein in the septic tank. Sulfates are broken down, releasing hydrogen sulfide and water. Because anaerobic treatment means 42 is always submerged, anaerobic treatment is assured.

Anaerobically treated fluid flows from manifold 52 into down spout 62 and begins filling holding well 60. Well 60 will fill until fluid reaches the level of connection means 66 whereupon the fluid will flow out of holding well 60 and into circulation well 64.

Referring now to FIGS. 2 and 3, circulation well 64 fills until the level of fluid therein reaches the level of high water sensor 100. At this point, sensor 100 sends a signal data bus 30 to logic means 28, which in turn sends a signal closing drain field valve 76 and opening manifold valve 78 and spray valve 80. Circulation pump 70 is also activated. Fluid is pumped by circulation pump 70 through the recirculation system. As previously noted, approximately 60% of the fluid is pumped through the anaerobic treatment means while 40% of the fluid is pumped over the aerobic treatment means through nozzles 84, 86 and 88.

After a newly installed filter has been used for several weeks, a bioslime forms on the surface of the trickling filter. The bioslime will mature in approximately six months. The filter may be inoculated to speed up the maturing process, if required. The fluid moves slowly over the surface of the bioslime. The reduction of organic loading occurs in two stages. The first stage comprises the removal of organic material by biosorption and coagulation. Soluble constituents of the water which moves more slowly over the filter are removed through metabolic use of the material by the organisms comprising the bioslime. While the vast majority of the activity taking place in the bioslime is aerobic, the organisms that are present in the portions of the slime closest to the filtering material will be operating in an anaerobic condition, because oxygen is blocked from these microbes by the outer portions of the bioslime.

Compounds containing sugars, starches, carbohydrates, simple and crude proteins are metabolized by the microbes, producing carbon dioxide and water, as well as providing the constituents for new microbial cells and energy. This reaction may be expressed as:

$$-(C,4H) + 2O_2 \xrightarrow{\text{Enzymatic Oxidation}} CO_2 + 2H_2O + \text{Energy} \tag{1}$$

Additionally, other reactions take place involving other components of the organic waste material, such as ammonia, sulfur containing compounds and compounds containing various metal ions. Ammonia, for instance is changed chemically as follows:

$$2NH_4 + 3O_2 \xrightarrow{\text{Enzymatic Reaction}} 2NO_2 + 2H_2O + 4H^+ \text{Energy} \tag{2}$$

$$2NO_2 + O_2 \longrightarrow 2NO_3 + \text{Energy} \tag{3}$$

Nitrite and ammonia which have entered the filter as the result of septic tank digestion, as well as the ammonium salts produced by microbial digestion, are oxidized first to nitrite, with water, hydrogen ions and energy being released. The nitrite is then further oxidized to nitrate and more energy is released. Hydrogen sulfide and other partially oxidized organic sulfur compounds are also further oxidized in the upper region.

The anaerobic activity in the lower region also promotes denitrification of the nitrified material produced in the aerobic, upper region. Common facultative anaerobes, such as Psuedomonas, carry out this type of action on both elemental nitrogen and nitrous oxide. These bacteria would prefer to respire using elemental oxygen, but when it is absent or reduced, they are able to respire using the oxygen found in nitrates. The overall results is a significant decrease in the concentration of nitrogen and nitrogen containing compounds in the septic tank effluent. (see Table 1, below).

Circulation pump 70 will operate for approximately two to three hours, in what is referred to herein as an active condition or cycle, recirculating the contents of the filter approximately 12 to 15 times. It is conceivable that during the course of this cycle, septic tank effluent would continue to enter filter 20 through line 18 and be mixed with the effluent undergoing treatment in the filter. However, under normal domestic or small business applications, such continued delivery of septic tank effluent to filter 20 should cause little problem and will not significantly reduce the level of purification accomplished by the filter.

Generation of fluid wastes and fluid-borne wastes follows a fairly predictable pattern for the normal dwelling. Initially, a quantity of waste will enter the septic system during the morning waking period, resulting in the gravity flow of some septic tank effluent into filter 20. If sufficient waste has been generated to initiate the active cycle, the filter will begin such a cycle and follow the cycle to completion. Generally, very little additional waste will be put into the system until afternoon or evening hours. In the case of a business, wastes are usually generated during normal business hours, with very little waste entering the system in the evening and night hours. These cycles provide adequate periods when very little effluent enters filter 20, thus allowing the filter to complete its active cycle while receiving minimal fresh septic tank effluent.

After the active cycle has been completed, as determined by logic means 28, valves 78 and 80 are closed and valve 76 is opened. UV light source 90 remains on at all times, to maintain the light in a disinfecting condition. The fluid which has been treated by filter 20 is then pumped from the circulation well through ultraviolet light source 90, and into the drain field. Once the level of fluid in circulation well 64 drops below low-water sensor 98, pump 70 and light source 90 are shut off.

Filter 20 then enters what is referred to herein as a resting stage or condition wherein the fluid in holding well 60 is allowed to settle, thus forming a layer of sediment or sludge at the base of holding well 60. Once a predetermined amount of time has passed, usually about one hour, logic means 28 activates pump 92, thereby returning the sediment and sludge to septic tank 16. The filter is then ready to enter an active cycle when sufficient effluent accumulates in tank 64.

The resting stage also provides time for the self-alignment of the biological growth on the aerobic treatment media, so as to maintain the bioslime at an appropriate thickness. If the bioslime is continually provided with nutrients, the layer will become too thick, and parts of the layer will luff off, falling into the anaerobic media or clogging the aerobic media. The resting period forces the bioslime to self-digest, thereby maintaining a desired bioslime thickness.

As previously noted, pumps 70 and 92 have sensors attached thereto which provide an input to logic means 28. If a length of time passes without pumps 70 or 92 being activated, logic means 28 will provide an alarm to notify the dwelling resident that there may be a pump malfunction.

Additionally, if the level of fluid in circulation well 64 becomes so high as to trigger alarm sensor 102, an alarm sounds, again notifying the dwelling resident of a possible malfunction in the filter. An alarm will also sound if UV source 90 become inoperative.

The filter disclosed herein has been demonstrated to significantly reduce the concentration of BOD and TSS after treating domestic septic tank effluent having measured flows of between 950 and 1200 gallons per day. The ultraviolet light is operable to assure substantially total fecal coliform kill in the effluent which is discharged into the drain field. Table 1 provides a comparison of effluent components following treatment by a septic tank, a sand filter, and the biological filter of the invention.

TABLE 1

Comparison of Effluent Components (Units: mg/L or ppm)

| Components | Septic Tank | Sand Filter | Biological Filter |
|---|---|---|---|
| BOD | 217 | 3.20 | 2.50 |
| TSS | 146 | 9.60 | 2.02 |
| Nitrite Nitrogen ($NO_2$—N) | 0.02 | 0.04 | 0.03 |
| Nitrate Nitrogen ($NO_3$—N) | 0.40 | 29.10 | 14.00 |
| Ammonia Nitrogen ($NH_3$—N) | 40.60 | 0.25 | 11.01 |
| Organic Nitrogen | 8.60 | 1.45 | 1.46 |
| Total Kjeldahl (Nitrogen) (TKN) | 58.70 | 1.70 | 12.47 |
| Total Nitrogen | 59.10 | 30.30 | 26.50 |
| Total Coliform | 1,320,000 | 18,400 | 15 |
| Fecal Coliform | 260,000 | 407 | 3 |

Although a preferred embodiment of the filter of the invention has been disclosed herein, it should be appreciated that variations and modifications may be made thereto without departing from the scope of the invention.

It is claimed and desired to secure as Letters Patent:

1. A biological filter for use between a septic tank and a drain field comprising:
   a filter tank, including an influent line from the septic tank, said filter tank having an anaerobic treatment means for treating, anaerobically, septic tank effluent and aerobic treatment means for treating, aerobically, septic tank effluent;
   a holding well for receiving fluid from said filter tank including connection means for providing fluid outflow from said holding well when the fluid reaches a predetermined level in said holding well; and
   a circulation well for receiving fluid from said connection means, including a circulation pump means for pumping the fluid selectively into said anaerobic treatment means, said aerobic treatment means, and the drain field.

2. The filter of claim 1 which includes an array of spray nozzles in said filter tank operatively connected to said circulation pump for broadcasting a first predetermined portion of the fluid over said aerobic treatment means.

3. The filter of claim 1 which includes a recirculation manifold operatively connected to said circulation pump for dispersing a second predetermined portion of the fluid into said anaerobic treatment means.

4. The filter of claim 1 wherein said anaerobic treatment means is located in the bottom of said filter tank and said aerobic treatment means is located above said anaerobic treatment means and which further includes a collection manifold located between said anaerobic treatment means and said aerobic treatment means, said collection manifold having a drain therefor located in said holding well.

5. The filter of claim 4 wherein said aerobic treatment means includes a fixed film reactor.

6. The filter of claim 4 wherein said anaerobic treatment means includes multiple layers of discrete, non-reactive particulate matter.

7. The filter of claim 1 which further includes a recovery pump in said holding well for returning fluid to the septic tank from said holding well when the filter is in a resting condition.

8. The filter of claim 1 which further includes logic means for controlling an operating cycle in the filter and sensor means operably located in the filter connected to said logic means to provide system status inputs to said logic means.

9. The filter of claim 1 which further includes disinfecting treatment means for disinfecting the fluid prior to the fluid being transferred to the drain field.

10. A biological filter for use between a septic tank and a drain field for treating a septic tank effluent comprising:
a filter tank having aerobic treatment means and anaerobic treatment means therein, said aerobic treatment means being located above said anaerobic treatment means, and including a holding well and a circulation well having connection means therebetween for providing fluid outflow from said holding well when the fluid reaches a predetermined level in said holding well;
an influent line for receiving the effluent from the septic tank;
an influent manifold disposed under said anaerobic treatment means adjacent the bottom of said system tank and connected to said influent line for infusing said anaerobic treatment means with the effluent;
a collection manifold disposed between said anaerobic treatment means and said aerobic treatment means for collecting the effluent after same has passed through both of said treatment means, said collection manifold having an outflow line into said holding well;
dispersal means for simultaneously from said circulation well, dispersing a portion of the effluent to said aerobic treatment means while dispersing the remaining effluent to said anaerobic treatment means; and
a circulation and connected to said dispersal means pump located in said circulation well for selectively pumping the effluent to said dispersal means and the drain field.

11. The filter of claim 10 wherein said dispersal means include an array of spray nozzles in said filter tank above said aerobic treatment means and a recirculation manifold below said anaerobic treatment means for delivering the effluent to the treatment means.

12. The filter of claim 11 wherein said aerobic treatment means includes a fixed film reactor.

13. The filter of claim 11 wherein said anaerobic treatment means includes multiple layers of discrete, non-reactive particulate matter.

14. The filter of claim 10 which includes logic means for controlling an operating cycle in the filter and for providing a resting stage.

15. The filter of claim 14 which further includes a recovery pump located in said holding well for returning fluid to the septic tank from said holding well when the filter is in a resting condition.

16. In a septic tank system, a biological filter for use between a septic tank and a drain field, including means for connecting the biological filter to the septic tank and drain field, comprising:
a filter tank, including an influent line from the septic tank, said filter having anaerobic treatment means for treating, anaerobically, septic tank effluent and aerobic treatment means for treating, aerobically, septic tank effluent, wherein said anaerobic treatment means is located in the bottom of said filter tank and said aerobic treatment means is located above said anaerobic treatment means;
a holding well for receiving fluid from said filter tank including connection means for providing fluid outflow from said holding well when the fluid reaches a predetermined level in said holding well;
a collection manifold located between said anaerobic treatment means and said aerobic treatment means, said collection manifold having a drain therefor located in said holding well; and
a circulation well for receiving fluid from said connection means, including a circulation pump means for pumping the fluid selectively into said anaerobic treatment means, said aerobic treatment means, and the drain field.

17. The system of claim 16 which includes an array of spray nozzles in said filter tank operatively connected to said circulation pump for broadcasting a first predetermined portion of the fluid over said aerobic treatment means.

18. The system of claim 16 which includes a recirculation manifold operatively connected to said circulation pump for dispersing a second predetermined portion of the fluid into said anaerobic treatment means.

19. The system of claim 16 wherein said aerobic treatment means includes a fixed film reactor.

20. The system of claim 16 wherein said anaerobic treatment means includes multiple layers of discrete, non-reactive particulate matter.

21. The system of claim 16 which further includes a recovery pump in said holding well for returning fluid to the septic tank from said holding well when the filter is in a resting condition.

22. The system of claim 16 which further includes logic means for controlling an operating cycle in the filter and sensor means operably located in the filter connected to said logic means to provide system status inputs to said logic means.

23. The system of claim 16 which further includes disinfecting treatment means for disinfecting the fluid prior to the fluid being transferred to the drain field.

* * * * *